June 10, 1947.  J. A. OBERMAIER  2,422,124
FLEXIBLY-MOUNTED THERMOCOUPLE FOR MEASURING SURFACE TEMPERATURE
Filed June 6, 1942  3 Sheets-Sheet 1
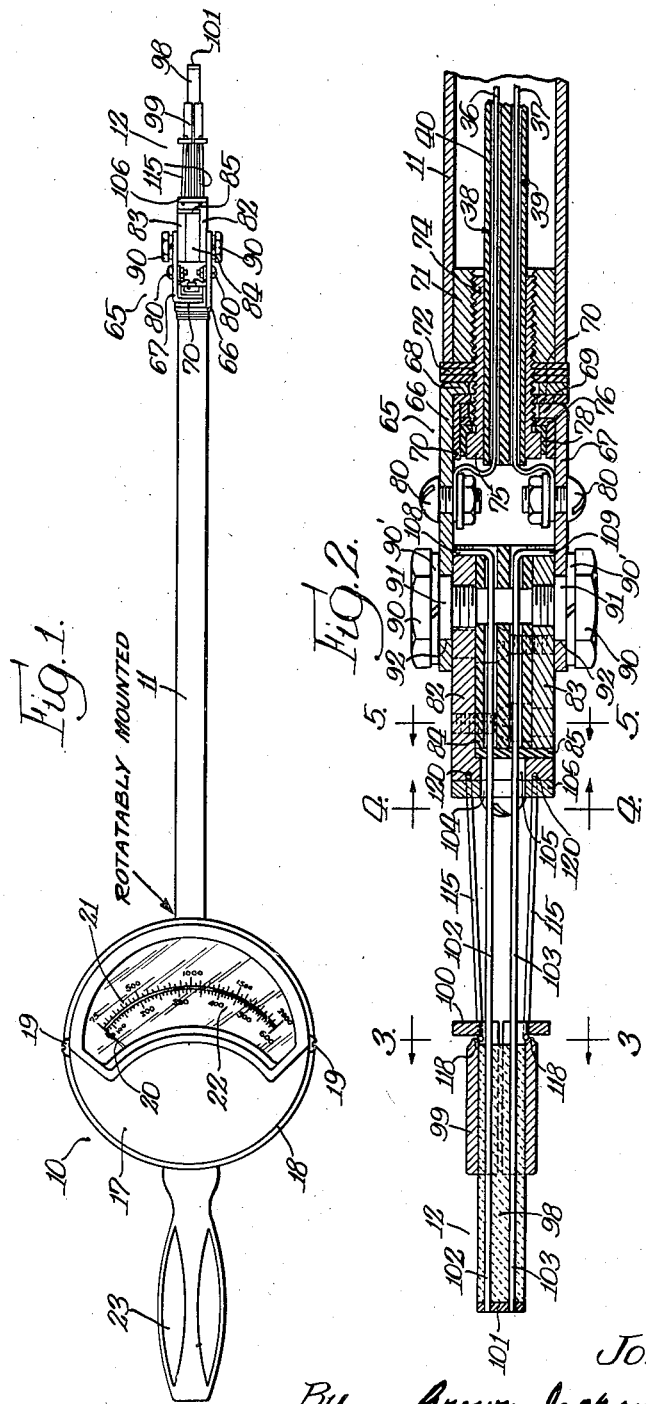
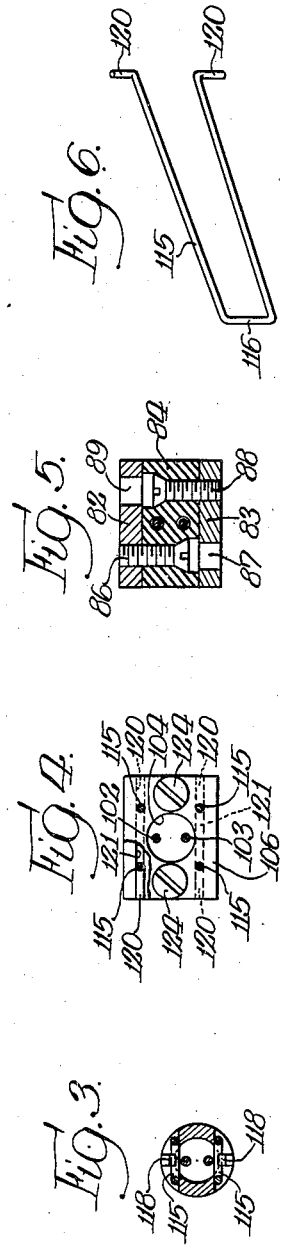
Inventor:
John A. Obermaier,
By Brown, Jackson, Boettcher & Dienner
Attys.

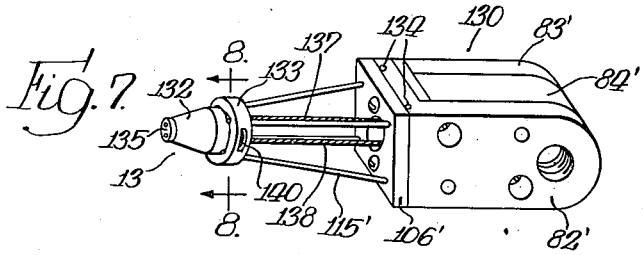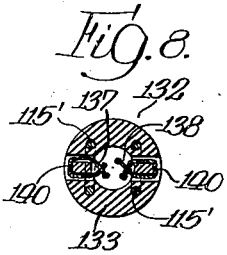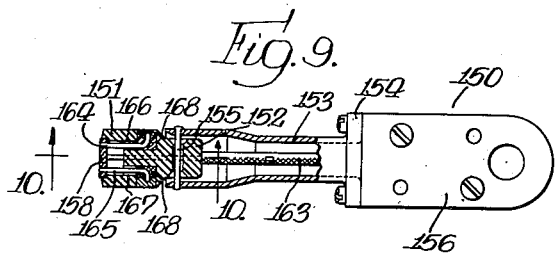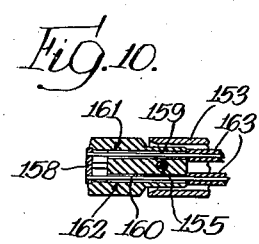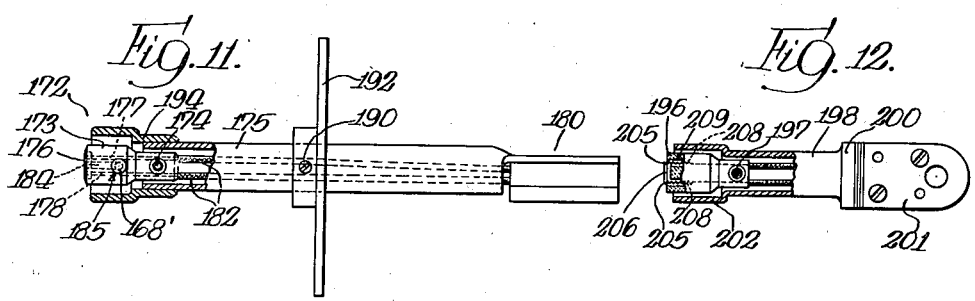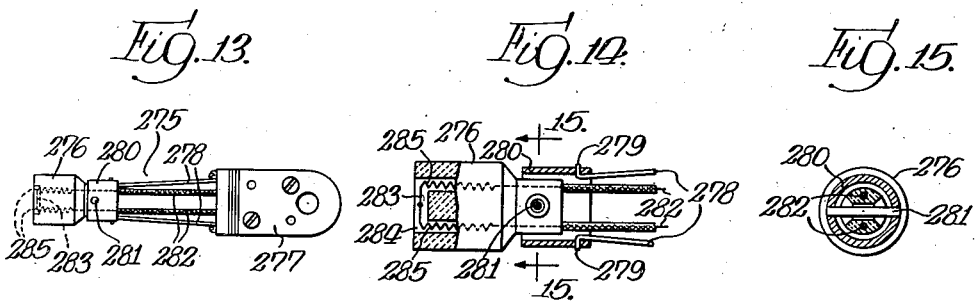

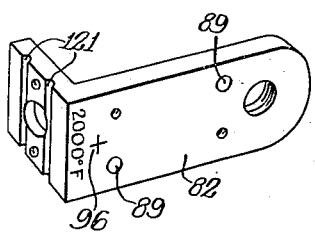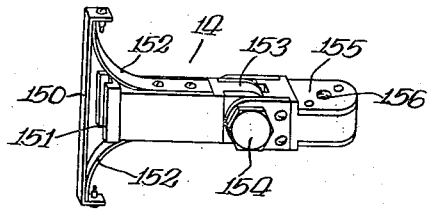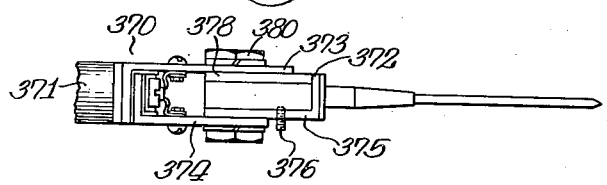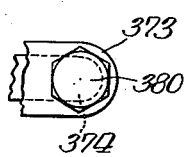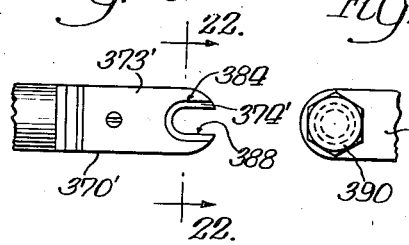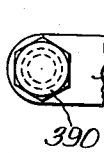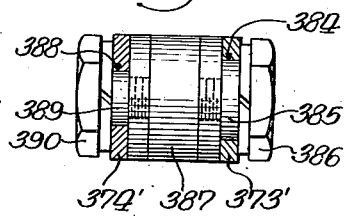

Patented June 10, 1947

2,422,124

UNITED STATES PATENT OFFICE 2,422,124

FLEXIBLY MOUNTED THERMOCOUPLE FOR MEASURING SURFACE TEMPERATURE

John A. Obermaier, Chicago, Ill.

Application June 6, 1942, Serial No. 446,045

15 Claims. (Cl. 136—4)

This invention relates to improvements in pyrometers.

While the invention is particularly applicable to surface temperature pyrometers for measuring the temperatures of production machinery and products, such, for example, as fly wheels, shafts, heated drums, calenders and the like, and in connection with plastic molding, die casting, rubber plants, paper mills, and elsewhere, it is to be understood that in its broader aspects the present invention is not limited to surface temperature pyrometers, but may be embodied in other pyrometers as suitable and desired.

The present application is a continuation-in-part of my copending application Serial No. 190,721, filed February 16, 1938, now Patent No. 2,285,457, issued June 9, 1942.

One of the main objects of the invention is to provide a pyrometer which will give an accurate and almost instantaneous reading by merely pressing the tip of the thermocouple part of the pyrometer in contact with the surface of the object, the temperature of which it is desired to measure, or by merely pushing the tip of the thermocouple into the object, or, in the case of heat zones, liquids, and molten metal, by placing the hot junction of the thermocouple therein.

It is a further object of the invention to provide a thermocouple which will pick up the temperature to be measured with great speed and which, at the same time, will have the desired strength. This is accomplished by separating the tip of the thermocouple from the base. The means which separates the tip of the thermocouple from its base supports the tip on the base and is strong, and, at the same time, of minimum mass, so that the instant the tip is applied to the object the thermocouple element is heated and an accurate reading is produced. The reduction in mass provides maximum thermal insulation. At the same time, the mass of the tip supporting and separating means is reduced without sacrificing the desired strength, and the construction whereby these advantages are obtained is a simple and natural one.

It is also an object of the invention to provide a thermocouple that is adapted for pivotal attachment, for example, to the outer end of an extension arm, the thermocouple being adapted to be swung about its pivotal support to different angular positions and being interchangeable with other thermocouples as suitable or desired.

It is a further object of the invention to provide a thermocouple having a tip or end piece mounted in a manner to permit the tip or end piece to accommodate itself, for example, to the surface of the object the temperature of which it is desired to measure and, more particularly, to provide a thermocouple in which this is accomplished, for example, either by mounting the tip or end piece, which carries the hot junction, for rocking movement, or by providing a mounting of yielding character for the tip or end piece.

A further object of the invention is to provide a thermocouple having a tip or end piece provided with a protecting sleeve or skirt.

Another object of the invention is to provide an improved form of hot junction and, more particularly, an improved form of hot junction having a hot junction element retained independently of the thermocouple wires, thus permitting the use of relatively fine thermocouple wires with the accruing advantages thereof.

Further objects and advantages of the invention will be apparent from the following detailed description, taken in connection with the accompanying drawings in which:

Figure 1 is a front elevational view of a pyrometer embodying the present invention;

Figure 2 is a fragmentary longitudinal detail section on an enlarged scale taken through the outer end of the extension arm of the pyrometer shown in Figure 1 and through the thermocouple mounted on the extension arm;

Figure 3 is a transverse detail section taken on the line 3—3 of Figure 2;

Figure 4 is a transverse detail section taken on the line 4—4 of Figure 2;

Figure 5 is a transverse detail section taken on the line 5—5 of Figure 2;

Figure 6 is a perspective view of one of the hairpin or U-shaped wires for supporting the tip of the thermocouple shown in Figures 1 and 2 on the thermocouple base;

Figure 7 is a perspective view showing another form of thermocouple embodying the present invention and adapted for use with the instrument shown in Figures 1 and 2;

Figure 8 is a transverse detail section taken on the line 8—8 of Figure 7;

Figure 9 is a side view, partially in longitudinal section, of another form of thermocouple embodying the prevent invention;

Figure 10 is a fragmentary detail section taken on the line 10—10 of Figure 9;

Figure 11 is a side view partially in longitudinal section of another form of thermocouple embodying the present invention;

Figure 12 is a view similar to Figure 11 of another form of thermocouple embodying the present invention;

Figure 13 is a side view of another form of thermocouple embodying the present invention;

Figure 14 is a fragmentary view partially in section and showing more in detail the thermocouple shown in Figure 13;

Figure 15 is a transverse section taken on the line 15—15 of Figure 14;

Figure 16 is a perspective view of the L-shaped thermocouple base member of the thermocouple shown in Figure 2;

Figure 17 is a perspective view showing a further form of thermocouple;

Figure 18 is a fragmentary side view showing a thermocouple and cooperating yoke with means for assuring proper application of the base of the thermocouple to the yoke;

Figure 19 is a fragmentary plan view of the structure shown in Figure 18;

Figure 20 is a fragmentary detail elevation showing another arrangement for assuring proper application of the base of the thermocouple to the yoke;

Figure 21 is a detail section taken on the line 21—21 of Figure 20, showing in elevation the base of the thermocouple in position in the yoke; and Figure 22 is a fragmentary side view of the base of the thermocouple.

Referring now to the drawings, the device illustrated in Figure 1 comprises an indicator 10 having an extension arm 11 upon the end of which a plurality of different types of thermocouples are adopted for interchangeable mounting.

The indicator 10 comprises a metallic casing 17 secured to an insulating base 18 by screws 19. The casing 17 serves as a housing for a meter which may be of any conventional galvanometer or milli-voltmeter construction, such, for example, as the general type of construction shown and described in my Patent No. 1,597,327, issued August 24, 1926. The meter includes a pointer 20 and a pair of scales 21 and 22. The scale 21 is calibrated for high temperature indications, and the scale 22 is calibrated for low temperature indications, as will hereinafter appear. Each scale 21 and 22 is graduated in terms of temperature, preferably in degrees of Fahrenheit. The casing 17 is provided with a handle 23, suitably secured, for example, to the base 18.

The extension arm 11 comprises a tubular metallic member adapted at one end for rotatable mounting on the indicator 10 and provided with contact means for connecting the thermocouple lead wires in circuit with the indicator, for example, as more fully disclosed in my Patent No. 2,285,457 above referred to.

The lead wires 36 and 37, which electrically connect the particular thermocouple mounted on the outer end of the extension arm 11 to the indicator 10, extend through the tubular arm 11 and are insulated from this arm and from each other in any suitable or preferred manner. In the illustrated embodiment of the invention, these wires 36 and 37 extend through openings 38 and 39 in a small diameter insulator 40 which may be formed of porcelain or other suitable insulating material. This insulator 40 is shown of circular cross section and extends substantially throughout the length of the tubular arm 11. At one end the wires 36 and 37 extend out from the end of the insulator 40 and are connected to the contact means or terminal members (not shown) on the arm 11, which contact means or terminal members are adapted for engagement with suitable contact means or terminal members on the indicator 10.

The outer end of the arm 11 is provided with a yoke or fork 65 for receiving any of the various types of thermocouples. This yoke 65 comprises, as shown in Figure 2, a pair of L-shaped metallic members 66 and 67 having apertured bases 68 and 69 respectively. These members 66 and 67 are assembled and insulated from each other by insulation 70, which may be mica or other suitable insulation. The adjacent end of the arm 11 is provided internally with a bushing 71 soldered or otherwise rigidly secured in place therein. Mica, "Bakelite," or other suitable insulation at 72 insulates the base 68 of the L-shaped fork member 66 from the adjacent end of the arm 11, and a tubular screw 74 headed at 75 passes through the openings in the bases 68 and 69 of the fork members 66 and 67 and has threaded engagement with the bushing 71 to secure the fork members rigidly in place on the outer end of the arm 11. Insulation at 76 insulates the screw 74 from the fork member 67. This insulation is backed by a channel-shaped metallic member 78, and the insulation 70 and 76 insulates the member 78 and the head of the screw 74 from the projecting legs of the fork members.

The insulator 40 passes axially through the tubular screw 74, and the lead wires 36 and 37 extend from the outer end of the insulator 40 and are connected by screws 80 and cooperating nut members, one to each of the fork members 66 and 67. The fork 65 thus constitutes not only a fork for mechanically supporting the various thermocouples, but also a fork through which the various thermocouples applied thereto are connected electrically to the lead wires 36 and 37. This eliminates the necessity for pigtail connections and the like, and is a distinct advantage.

The particular thermocouple 12 shown applied to the fork 65 is for measuring the temperatures of either metallic or non-metallic surfaces, whether the surface is soft or hard, clean or coated. It is especially suitable for plastic or rubber molds, platens, plates, glassware and walls or other relatively flat surfaces. The unique construction reduces conduction loss to a minimum, and gives maximum accuracy.

The thermocouple 12 comprises a mounting base consisting of an L-shaped metallic member 82 and a flat metallic member 83 insulated from each other by a fiber, "Bakelite," or other suitable insulating block 84 disposed therebetween. Mica or other suitable insulation at 85 insulates the apertured base of the member 82 from the adjacent end of the member 83. The member 82 is secured to the block 84 by screws 86 which are accessible (Figure 5) through openings 87 in the member 83 and which are applied to position with their heads countersunk in one side of the block 84 and thereby insulated from the member 83. The member 83 is similarly secured to the block 84 from the opposite side by screws 88 which are accessible through openings 89 in the member 82 and are applied to position with their heads countersunk in the opposite side of the block 84 and thereby insulated from the member 82.

The thermocouple mounting base is pivotally secured between the projecting legs of the fork 65 by coaxial screws 90. These screws 90 have heads at their outer ends and adjacent said heads, have cylindrical portions 91 which fit in openings 92 in the projecting legs of the fork 65.

The reduced diameter inner ends of these screws 90 are threaded and have threaded engagement with correspondingly threaded openings in the metallic members 82 and 83 of the thermocouple mounting base. Phosphor bronze or other suitable washers 90' between the heads of the screws 90 and the legs of the fork 65 provide friction tight joints which permit turning movement of the thermocouple base about the cylindrical portions 91 of the screws 90 and frictionally hold the base of the thermocouple in the different angular positions to which it is turned.

The ability of the thermocouple to be turned and held in any angular position about the common axis of the screws 90, particularly where the opposite end of the extension arm 11 is adapted to be rotated about the longitudinal axis of this arm and clamped in any angular position as disclosed and claimed in the Patent No. 2,285,457, makes it possible to place the thermocouple unit in any position to contact the heated surface and with the front of the indicator 10 disposed toward the operator so that the temperature may be ascertained at a glance.

The angular fork member 66 of the yoke 65 is preferably provided with a plus (+) marking, and the angular member 82 of the thermocouple base is likewise preferably provided with a plus (+) marking indicated at 96 in Figure 16, or the parts are otherwise suitably marked to make sure that the thermocouple is properly applied to the yoke 65. If the thermocouple were applied with its plus (+) side in contact with the minus (—) side of the yoke 65, the instrument would read backwards.

The tip of the thermocouple 12 comprises a small diameter insulating tip 98 formed of porcelain or other insulating material which will withstand the high temperatures to which the device is subjected. The insulating tip 98, shown of circular section, is cemented or otherwise suitably secured in a metallic tip holder 99 of tubular form and provided with an annular base flange 100 at its inner end. A disc 101 of platinum, gold, or other suitable material secured in place at the outer end of the tip 98, constitutes the hot junction of the thermocouple.

The lead wires 102 and 103 for the thermocouple extend through openings in the insulating tip 98 and are insulated from one another by this tip. The outer ends of these wires are welded or otherwise suitably joined to the disc 101. The wires 102 and 103 pass through openings 104 and 105 in a clamping plate 106 and in the base of the angular member 82, and extend through suitable openings in the insulating block 84 and are turned out or otherwise connected at their opposite ends at 108 and 109, one to the metallic base member 82 and the other to the metallic base member 83. Thus, when the base member of the thermocouple is applied to the yoke 65, the contact between the yoke members 66 and 67 and the base members 82 and 83 completes the circuit between the wires 102 and 103 and the lead wires 36 and 37.

The tip of the thermocouple is supported an appropriate distance from the base of the thermocouple by two hairpin or U-shaped wires 115 preferably formed of steel wire, piano wire, or the like, so that they will be of great strength and, at the same time, may be of small dimension. These wires 115 conduct very little heat and, at the same time, they are yieldable to such extent that the thermocouple will adapt itself to the surface to which it is applied.

In the illustrative embodiment of this form of thermocouple, the U-shaped wires 115 are applied with their legs extending through openings in the flange 100 of the tip holder 99. The bend 116 between the legs of each wire 115 is held between the flange 100 and shoulders formed by notches or upset portions 118 in the external periphery of the tubular extension of the tip support. At their free ends the extending legs of the wires 115 are turned out at right angles and these right angle ends 120 are positioned in grooves 121 in the adjacent face of the L-shaped base member 82, and are clamped therein by the clamping member 106 which has openings through which the wires 115 extend and an enlarged opening through which the lead wires 102 and 103 extend clear of the clamping member 106. The depths of the grooves 121 are preferably slightly less than the diameters of the wires 115, and the clamping member 106 is secured to the L-shaped base member 82 by screws 124.

The thermocouple 13 as shown in Figures 7 and 8 is a low temperature thermocouple for the measurement of low temperature indications on the low temperature scale 22 of the indicator 10. The means for setting the device selectively to indicate on the high and low temperature scales is shown and described in my Patent No. 2,285,457 mentioned above. This thermocouple 13 is interchangeable with the thermocouple 12, and its base 130, which is similar to the base of the thermocouple 12, is adapted for pivotal attachment to the fork 65 in the manner in which the base of the thermocouple 12 is applied to this fork.

The tip 132 is formed of fiber or other suitable insulation and has an integral base flange 133 to which the bends of the hairpin or U-shaped wires 115' are secured as in the preceding embodiment of the invention. The out-turned ends of the extending legs of these wires 115' are clamped in notches 134 in the base member 82' by a clamping member 106' as in the preceding embodiment of the invention. A disc 135, formed of gold or other suitable material and secured in place at the outer end of the tip 132, constitutes the hot junction of this thermocouple. The insulating block 84' of fiber, lava, or other suitable insulating material, corresponds with the block 84 of the preceding embodiment of the invention.

The thermocouple wires 137 and 138 are brazed or otherwise suitably connected to the disc 135 and extend through spaced openings in the tip 132 which insulates these wires one from the other. The wires 137 and 138 extend on through openings in the clamping member 106' and in the base member 82' and through openings in the insulating block 84' and are connected one to one metallic base member 82' and the other to the other metallic base member 83' as in the preceding embodiment of the invention. In this case, however, the thermocouple wires 137 and 138 are preferably looped through openings in the flange 133 of the tip 132 and are thereby anchored at 140 to the base end of the tip.

The thermocouple shown in Figures 9 and 10 is interchangeable with the thermocouples 12 and 13, and its base 150—which is similar to the base 130 of the thermocouple 13 and to the base of the thermocouple 12—is adapted for pivotal attachment to the fork 65 in the manner in which the bases of the thermocouples 12 and 13 are applied to this fork.

The tip of this thermocouple comprises an insulating tip 151 formed of lava, fiber, or other suitable insulating material. A lava tip is suitable for the higher temperature ranges, and a fiber tip is suitable for the lower temperature ranges. The insulating tip 151, which is preferably of circular cross section, has an inner end 152 of reduced diameter which extends freely into the outer end of a tubular extension 153 on the clamping member or base part 154, and is pivoted on a pin 155 the ends of which are carried by the outer end of the tubular extension 153. The clamping member or base part 154 corresponds with the clamping member or base part 106 of the thermocouple shown in Figure 7, and the base member 156 corresponds with the base member 82 of the thermocouple shown in Figure 7. The opening in the inner end of the tip 151 through which the pin 155 passes is of a diameter sufficiently larger than the diameter of the pin to permit a loose pivotal action of the tip 151 about the pin 155, thereby making the end of the tip self-accommodating, for example, to the surface the temperature of which it is desired to measure.

A disc 158 of platinum, gold, or other suitable material secured in place at the outer end of the tip 151 constitutes the hot junction of the thermocouple. The thermocouple wires 159 and 160 are brazed, welded, or otherwise joined to the disc 158 and extend longitudinally through longitudinal openings 161 and 162 in the tip member as shown in Figure 10, and are connected at their opposite ends, for example, to the metallic base member 156 and the cooperating base member in the manner shown more in detail in Figure 2. The portions of the wires 159 and 160 extending beyond the inner end of the tip 151 are preferably covered with insulation as shown at 163.

Also brazed or otherwise secured to the disc 158 are a second pair of wires 164 and 165 which extend through longitudinal openings 166 and 167 in the enlarged outer end of the tip. The inner ends of the wires 164 and 165 are turned out laterally and cemented at 168 or otherwise secured in lateral openings in the tip 151. The wires 164 and 165 may be brazed or joined to the disc 158 at the same time that the wires 159 and 160 are brazed or joined to the disc. The wires 164 and 165 constitute retaining wires, thereby permitting the use of very fine thermocouple wires because the thermocouple wires are not depended on to retain the disc 158 in place. This contributes to reducing conduction losses to a minimum, and the thermocouple junctions are close together to minimize conduction loss through the supporting medium. In use, the tip 151, and particularly the hot junction thereon, is self-accommodating to the surface the temperature of which it is desired to measure by loose pivotal movement of the tip 151 about the pin 155.

The thermocouple 172 shown in Fig. 11 has the insulating refractory tip 173 loosely pivoted on a pin 174 in the outer end of the tubular extension 175 in the manner in which the tip 151 of the previous embodiment of the invention is pivoted on the pin 155.

The disc 176 of platinum, gold, or other suitable material is secured in place at the outer end of the tip 173 and constitutes the hot junction of the thermocouple. The thermocouple wires 177 and 178 are brazed, welded, or otherwise joined to the disc 176 and extend longitudinally through longitudinal openings in the tip member 173 and through the tubular extension 175 and are connected at their opposite ends, for example, to the metallic base members of the mounting base 180 which is adapted to be mounted in the yoke at the outer end of the extension arm 11 interchangeably with the other thermocouples. The portions of the wires 177 and 178 extending beyond the inner end of the tip 173 are preferably covered with insulation at 182.

Retaining wires 184, similar to the retaining wires shown in Figure 9, are preferably brazed or otherwise joined to the disc 176. These wires 184 extend through longitudinal openings in the enlarged outer end of the tip 173, and their inner ends are turned out laterally and cemented at 168 or otherwise secured in lateral openings 185 in the tip 173. As in the embodiment of the invention shown in Figures 9 and 10, the retaining wires 184 may be brazed or joined to the disc 176 at the same time that the thermocouple wires are brazed or joined to the disc. The wires 184 retain the disc 176 in place, and thereby make it unnecessary to retain this disc in place by the thermocouple wires. The thermocouple wires may, therefore, be made very fine. The conduction loss in this embodiment of the invention, as in the embodiment shown in Figures 9 and 10, is reduced to a minimum.

The tubular extension arm 175 is shown as having detachably mounted thereon, for example by a screw 190, an annular shield 192 which protects, for example, the insulation, screws, screw threads and the like at the mounting base 180 of the thermocouple from the high temperatures to which the hot junction of the thermocouple is adapted to be subjected. If the head room is not large enough for the operator to pass the shield 192 and reach his work, the shield 192 may be removed by loosening the screw 190.

A tubular protecting sleeve 194 is secured to the outer end of the tubular extension arm 175 and has an enlarged outer end which surrounds and protects the tip 173 and the parts carried thereby. The end of the tip 173, and particularly the disc 176, projects endwise from the end of the protecting sleeve 194 for engagement, for example, with the surface the temperature of which it is desired to measure. Pivotal movement of the tip 173 about the pin 174 permits the end of the tip, and particularly the disc or junction 176, to fit against the surface the temperature of which it is desired to measure even where the tip is applied at an angle to such surface. The hot junction of the thermocouple shown in Fig. 11 is thus self-accommodating to the surface to which it is applied in the manner in which the hot junction of the thermocouple shown in Figures 9 and 10 is self-accommodating to the surface to which such hot junction is applied.

The tip or hot junction of the embodiment of the invention shown in Figures 7 and 8, and the tip or hot junction of the embodiment of the invention shown in Figures 1 and 2 are self-accommodating to the surfaces to which they are applied due to the springiness in the wire supports for the tips of these thermocouples.

In the embodiment of the invention shown in Figure 12, the refractory tip 196 is loosely pivoted on a pin 197 carried at its opposite ends by the tubular extension arm 198 on the clamping member 200 which corresponds, for example, with the clamping member 198 of the embodiment of the invention shown in Figures 7 and 8. In this embodiment of the invention the tubular protecting sleeve 202 is formed as an integral part of the outer end of the extension arm 198, and the inner end of the tip 196 is reduced in diameter to extend into the arm 198 for loose pivotal support on the pin 197.

The thermocouple wires 205 are joined to form the hot junction 206 at the outer end of the tip 196. The hot junction 206 may be formed by a welded or other suitable connection between the thermocouple wires, and this junction is positioned outwardly of the outer end of the tip or in a recess at the outer end of the tip. Coiled spring portions 208 are provided in the thermocouple wires 205 to provide suitable spring tension therein, the longitudinal openings 209 in the tip being formed to receive these coiled spring portions of the thermocouple wires. The thermocouple shown in Figure 12 is extremely rapid in operation, and the thermocouples with the disc type of hot junction are particularly suitable for higher temperatures and where durability is desired and speed not so important.

The thermocouple 275, shown in Figures 13, 14 and 15, has the refractory tip 276 supported the desired distance from the base 277 by wires 278 which preferably converge from the base toward their outer ends. The outer ends of each pair of these wires are twisted together and turned out laterally at 279, and a collar 280 is pivotally supported upon the out-turned ends 279 for swinging movement thereon. The base 277 is adapted for pivotal attachment to the fork 65 at the outer end of the extension arm 11 in the manner in which the bases of the other thermocouples herein disclosed are attached to the fork. The inner end of the tip 276 is reduced in diameter to extend into the collar 280 with adequate clearance therebetween, and has pivotal support in the collar 280 upon a pin 281 disposed at right angles to the common axis of the out-turned ends 279 of the wires 278.

A compound pivotal or full swivel support is thus provided for the tip 276, which tip is adapted to turn in one plane about the pivot 281 and in a plane at right angles thereto about the out-turned ends 279 of the wires 278. The lead wires 282 are connected to the hot junction 283 at the outer end of the tip 276. The hot junction 283 may be formed by a welded or other suitable connection between the thermocouple wires, and preferably is positioned in a recess 284 in the outer end of the tip 276, coiled spring portions 285 being provided in the thermocouple wires to provide suitable spring tension therein.

The thermocouple 275 is extremely rapid. It provides a reading in three to five seconds. The full swiveling of the tip 276 provides for automatically positioning it against the desired surface. This eliminates the necessity and bother of aligning the tip with the surface.

In effect, the wires 278 separate the tip of the thermocouple from the base, and the size or mass of the thermocouple tip is so small that an excellent and exceedingly quick pick-up of the temperature to be measured is secured. At the same time the wires 278 provide a tip support which is exceedingly strong and has a minimum mass whereby maximum thermal insulation is secured. These are important aspects of the present invention, because if the size or mass of the parts were too small, the desired temperature pick-up would not be secured and, at the same time, if the tip were not detached from the body of the thermocouple and yet of the desired strength, the device would not be satisfactory.

The thermocouple 14 shown in Figure 17 is a ribbon type thermocouple which is made up to fit small and medium diameter cylinders or curved surfaces. Its hot junction is in the form of a suitable metallic ribbon 150 which is yieldable to the surface to which it is applied. A channeled stop at 151 and spring arms 152 are arranged to support the ribbon 150 and to limit the pressure of the same while in contact with the revolving surface to prevent excessive wear.

The base end 153 of this thermocouple is pivoted at 154 on a mounting member 155 which, in turn, has threaded openings 156 at right angles to the axis of the pivot screws 154 for engagement with the screws 90 pivotally to support the thermocouple, for example, on the fork 65. The member 155 is thus capable of being turned and clamped in any angular position about the common axis of the screws 90, and the member 153 is capable of being turned and clamped in any angular position about the axis of the pivot screws 154, which, together, and with the ability of the extension arm 11 to be turned and clamped in any angular position, is a distinct advantage in that with these angular movements it is possible to place the thermocouple in any position to permit it to contact the heated surface with the front of the indicator 10 directed toward the operator.

In Figures 18 and 19 I have shown means for assuring proper application of the base of the thermocouple to the yoke or fork 370 at the outer end of the arm 371 that projects from the indicator. The yoke or fork 370 is similar to the fork 65 shown in Figure 2, and the base 372 of the thermocouple is similar to the base shown in the same figure except that the leg 373 of the fork is wider and longer than the other leg 374, and the metallic member 375 of the thermocouple base has a stop 376 thereon. The greater width and length of the leg 373 is secured by forming same about a greater radius at the rounded outer end, and the stop may be in the form of a screw having threaded engagement with the member 375. The stop 376 together with the greater width and length of the leg 373 prevents positioning the base of the thermocouple between the legs 373 and 374 of the fork 370 except with the metallic member 375 in contact with the leg 374 and the metallic member 378 in contact with the leg 373 regardless of the angle at which the base of the thermocouple is inserted between the legs of the fork 370.

The thermocouple shown in Figure 18 need not be of the needle type as shown, but may be of any other type interchangeable with the other thermocouples. Its base is pivoted to the fork 370 at 380.

Figures 20, 21 and 22 show another arrangement for assuring proper application of the base of the thermocouple to the yoke or fork 370'. In this case, one leg 373' of the fork 370' has a slot 384 opening from the end thereof for receiving the cylindrical portion 385 of one of the pivot screws 386 on the thermocouple base 387, and the other leg 374' has a narrower slot 388 opening from the end thereof for receiving the cylindrical portion 389 of the other coaxial pivot screw 390. The larger pivot screw not being engageable in the narrow slot 388, the desired positioning of the base of the thermocouple in the fork 370' is assured because assembly is possible only with the thermocouple in proper position.

In practice, the loose pivotal action of the tip 151 about the pin 155 (Figures 9 and 10), and the corresponding loose pivotal action of the corresponding tip members in Figures 11, 12, 13, 14, and 15 about their pivot pins 174, 197, and 281, respectively, permits a more or less universal movement of the tip for self-accommodation of the hot junction of the thermocouple to the object to which the thermocouple is applied. With this provision it is not necessary for the user of the device perfectly to align the same with the object to which the device is applied, yet proper application of the tip of the device, and particularly the hot junction of the thermocouple to the object, is assured.

In Figures 11 and 12 the hot junction is shown extending out beyond the end of the tip. This is particularly adapted for low temperatures up to approximately 800° F. For higher temperatures, i. e., temperatures over approximately 800° F., the hot junction is preferably disposed substantially flush with the end of the insulating tip.

In Figure 14 the hot junction is shown set in within the end of the tip inwardly slightly of the outer end of the tip.

The coiled spring portions 208 of the thermocouple elements in Figure 12, and the corresponding coiled spring portions 285 of the thermocouple elements in Figures 13 and 14 give a spring action at the hot junction of the thermocouple. The compressibility of the spring portions provides for better contact of the hot junction with the object when the thermocouple is applied thereto.

The protecting sleeve 194 in Figure 11, and the protecting sleeve 202 in Figure 12 constitute shields for mechanically protecting the tips against being broken or injured by bumping into or engagement with another object.

I do not intend to be limited to the precise details shown or described.

I claim:

1. In thermocouple assembly, a base part comprising a pair of metallic base members insulated from each other, a support extending from said base part, an insulating tip pivoted on said support for turning movement about an axis spaced from said base part, a metallic disc at the outer end of said tip, a pair of thermocouple wires joined to said disc and extending longitudinally through said tip and connected in circuit with said base members, and disc retaining wires joined to and retaining said disc at their outer ends and having their inner ends turned laterally and cemented in said tip.

2. A thermocouple assembly comprising a base, an insulating tip having a portion exposed for application to a hot object, a pair of thermocouple elements insulated from each other adjacent said base and extending from said base to said tip and joined to form a thermal junction adjacent the exposed portion of said tip, and relatively slender wire-like means carried by and extending from said base and supporting said tip in position spaced from said base independently of said thermocouple elements and whereby thermally to insulate the tip from the base.

3. A thermocouple assembly comprising a base, an insulating tip having a portion exposed for application to a hot object, a pair of thermocouple elements insulated from each other adjacent said base and extending from said base to said tip and joined to form a thermal junction adjacent the exposed portion of said tip, and relatively slender wire-like means carried by and extending from said base and supporting said tip in position spaced from said base independently of said thermocouple elements and whereby thermally to insulate the tip from the base part, said wire-like tip supporting means permitting self-accommodation of said tip to the object to which the thermocouple is applied.

4. A thermocouple assembly comprising a base, an insulating tip having a portion exposed for application to a hot object, a pair of thermocouple elements insulated from each other adjacent said base and extending from said base to said tip and joined to form a thermal junction adjacent the exposed portion of said tip, and a plurality of relatively slender wires extending longitudinally and in spaced relation from said base and supporting said tip in position spaced from said base independently of said thermocouple elements and whereby thermally to insulate the tip from the base part.

5. A thermocouple assembly comprising a pair of metallic base members insulated from each other and adapted for connection in circuit with an indicator, an insulating tip having a portion exposed for application to a hot object, a pair of thermocouple elements insulated from each other adjacent said base members and extending from said base members to said tip and joined to form a thermal junction adjacent the exposed portion of the tip and connected in circuit with the respective base members, and a plurality of relatively slender wires extending longitudinally and in spaced relation from said base members and supporting said tip in position spaced from said base members independently of said thermocouple elements and whereby thermally to insulate the tip from the base members.

6. A thermocouple assembly comprising a pair of metallic base members insulated from each other and adapted for connection in circuit with an indicator, an insulating tip having a portion exposed for application to a hot object, a pair of thermocouple elements insulated from each other adjacent said base members and extending from said base members to said tip and joined to form a thermal junction adjacent the exposed portion of the tip and connected in circuit with the respective base members, and a plurality of relatively slender wires extending longitudinally and in spaced relation from said base members and supporting said tip in position spaced from said base members independently of said thermocouple elements and whereby thermally to insulate the tip from the base members, said tip supporting wires permitting self-accommodation of said tip to the object to which the thermocouple is applied.

7. A thermocouple assembly comprising a pair of metallic base members insulated from each other and adapted for connection in circuit with an indicator, a tip of relatively small mass and exposed for application to a hot object, a tip supporting part joined to said tip, relatively slender wire-like means carried by and extending from said base members and secured to said tip supporting part to support said tip and tip supporting part in position spaced from said base members whereby thermally to insulate said tip from the base members, and a pair of thermocouple elements joined to form a thermal junction adjacent the exposed portion of the tip and extending through the space between the tip and the base members and connected in circuit with the respective base members.

8. A thermocouple assembly comprising a pair of metallic base members insulated from each other and adapted for connection in circuit with an indicator, a tip of relatively small mass and exposed for application to a hot object, a tip supporting part joined to said tip, a pair of relatively slender U-shaped wires having the legs thereof secured to said base members and extending from said base members with the bends between the legs of the wires secured to said tip supporting part to support said tip and tip supporting part in position spaced from said base members whereby thermally to insulate the tip from the base members, and a pair of thermocouple elements joined to form a thermal junction adjacent the exposed portion of the tip and extending through the space between the tip and the base members and connected in circuit with the respective base members.

9. A thermocouple assembly comprising a pair of metallic base members insulated from each other and adapted for connection in circuit with an indicator, an insulating tip of relatively small mass and having an outer end exposed for contact with a hot object, a tubular tip holder supporting said tip, relatively slender wire-like means carried by and extending from said base members and secured to said tip holder to support said holder and tip in position spaced from said base members whereby thermally to insulate the tip from the base members, and a pair of thermocouple elements joined to form a thermal junction adjacent the outer end of the tip and extending through the space between the tip and the base members and connected in circuit with the respective base members.

10. A thermocouple assembly comprising a pair of metallic base members insulated from each other and adapted for connection in circuit with an indicator, relatively slender wire-like means carried by and extending from said base members, a tip supporting part pivoted on the outer end of said wire-like means and supported by said wire-like means in position spaced from the base members whereby thermally to insulate the tip supporting part from the base members, a tip pivotally supported on said tip supporting part and exposed for application to a hot object, and a pair of thermocouple elements joined to form a thermal junction adjacent the exposed portion of the tip and extending through the space between the tip and the base members and connected in circuit with the respective base members.

11. A thermocouple assembly comprising a pair of metallic base members insulated from each other and adapted for connection in circuit with an indicator, relatively slender wire-like means carried by and extending from said base members, a tip having generally swivel support on the outer end of said wire-like means and held by said wire-like means spaced from the base whereby thermally to insulate the tip from the base, said tip having a portion exposed for contact with a hot object, and a pair of thermocouple elements joined to form a thermal junction adjacent the exposed portion of the tip and extending through the space between the tip and the base members and connected in circuit with the respective base members.

12. A thermocouple assembly comprising a pair of metallic base members insulated from each other and adapted for connection in circuit with an indicator, a tip of relatively small mass and exposed for application to a hot object, a tip supporting part joined to said tip, relatively slender wire-like means carried by and extending from said base members and secured to said tip supporting part to support said tip and tip supporting part in position spaced from the base members whereby thermally to insulate the tip from the base members, and a pair of thermocouple elements joined to form a thermal junction adjacent the exposed portion of the tip and extending through the space between the tip and the base members and connected in circuit with the respective base members, said thermocouple elements having coiled portions providing spring tension elements therein.

13. A thermocouple assembly comprising a base, an insulating tip having a portion exposed for application to a hot object, a metallic disc carried on the exposed portion of the tip, a pair of thermocouple elements insulated from each other adjacent said base and extending from the base through said tip and joined to said disc to form a thermal junction adjacent the exposed portion of the tip, and a plurality of relatively slender wires extending longitudinally and in spaced relation from said base part and supporting said tip in position spaced from the base independently of said thermocouple elements and whereby thermally to insulate the tip from the base.

14. In a device of the class described, in combination, a base, tip supporting means extending from said base, a tubular tip supporting member pivoted on said tip supporting means for free tilting movement in position spaced from said base, an insulating tip coaxial with said tip supporting member, said insulating tip having a portion thereof extending into and pivoted within said tip supporting member for free pivotal movement at substantially right angles to the pivotal movement of said tubular tip supporting member on said tip supporting means, and a pair of thermocouple elements joined to form a thermojunction adjacent the outer end of said tip.

15. In a device of the class described, in combination, a base, a pair of wires carried by and extending from said base and having their outer ends turned out laterally, a tubular tip supporting member pivoted on the laterally outturned ends of said wires, an insulating tip coaxial with said tip supporting member, said insulating tip having a portion thereof extending into and pivoted within said tip supporting member for free pivotal movement at substantially right angles to the pivotal movement of said tubular tip supporting member on the outturned ends of said wires, and a pair of thermocouple elements joined to form a thermojunction adjacent the outer end of said tip.

JOHN A. OBERMAIER.

REFERENCES CITED

The following references are of record in the file of this patent:

UNITED STATES PATENTS

| Number | Name | Date |
| --- | --- | --- |
| 846,998 | Hammond | Mar. 12, 1907 |
| 2,022,515 | Orchard | Nov. 26, 1935 |
| 2,142,677 | Parker | Jan. 3, 1939 |
| 2,282,441 | Whitlock | May 12, 1942 |
| 1,883,444 | Albert | Oct. 18, 1932 |
| 1,936,140 | Obermaier | Nov. 21, 1933 |
| 1,552,284 | Evins | Sept. 1, 1925 |
| 1,553,789 | Moeller | Sept. 15, 1925 |
| 1,612,897 | Zethmayr | Jan. 4, 1927 |
| 1,648,942 | Hayman | Nov. 15, 1927 |
| 2,035,995 | Sturges | Mar. 31, 1936 |
| 2,156,853 | Huggins | May 2, 1939 |
| 2,317,168 | Ball | Apr. 20, 1943 |
| Re. 14,243 | Bristol | Jan. 9, 1917 |

(Other references on following page)

UNITED STATES PATENTS

| Number | Name | Date |
|---|---|---|
| 1,648,899 | Hayman | Nov. 15, 1927 |
| 2,161,370 | Mears | June 6, 1939 |
| 2,353,199 | Stoffel et al. | July 11, 1944 |
| 2,279,846 | Stapleton | Apr. 14, 1942 |
| 1,343,393 | Hoffman | June 15, 1920 |
| 1,979,085 | Vollrath | Oct. 30, 1934 |

FOREIGN PATENTS

| Number | Country | Date |
|---|---|---|
| 519,783 | Great Britain | Apr. 5, 1940 |
| 154,454 | Great Britain | Dec. 2, 1920 |
| 527,778 | Great Britain | Oct. 16, 1940 |

OTHER REFERENCES

Spear et al., Industrial and Eng. Chemistry, August 1923, p. 844. (Copy in Sc. Libr.)

Roeser et al., Bur. Stds. J. Research, vol. 5 (1930), p. 795.

Pyrometer Inst. Co., Instruments, vol. 8 (1935), p. 161.

Russell Elec. Co., Instruments, February, 1935, p. 53.

Pyrometer Inst. Co., Instruments, April, 1936, p. 93. (Copy in Sc. Libr.)

Pyrometer Inst. Co., catalog No. 110, p. 3. (Copy in Div. 60, 136–414.)